(12) United States Patent
Lapierre et al.

(10) Patent No.: US 12,520,253 B2
(45) Date of Patent: Jan. 6, 2026

(54) RF SPECTRUM ANALYZER FOR TDD TRANSMISSION THAT MAINTAINS SYNCHRONIZATION BETWEEN UL AND DL WITH A SINGLE ANTENNA

(71) Applicant: EXFO Inc., Québec (CA)

(72) Inventors: Dominic Lapierre, Rigaud (CA); Luc Germain, Candiac (CA)

(73) Assignee: EXFO Inc., Quebec (CA)

( * ) Notice: Subject to any disclaimer, the term of this patent is extended or adjusted under 35 U.S.C. 154(b) by 421 days.

(21) Appl. No.: 18/087,276

(22) Filed: Dec. 22, 2022

(65) Prior Publication Data

US 2023/0254788 A1 Aug. 10, 2023

Related U.S. Application Data

(60) Provisional application No. 63/311,278, filed on Feb. 17, 2022, provisional application No. 63/265,909, filed on Dec. 22, 2021.

(51) Int. Cl.
*H04W 24/08* (2009.01)
*H04L 5/14* (2006.01)
*H04W 56/00* (2009.01)

(52) U.S. Cl.
CPC ............. *H04W 56/001* (2013.01); *H04L 5/14* (2013.01); *H04W 24/08* (2013.01)

(58) Field of Classification Search
CPC ...... H04W 56/001; H04W 24/08; H04L 5/14; H04L 27/2675; H04B 17/345
See application file for complete search history.

(56) References Cited

U.S. PATENT DOCUMENTS 8,179,118 B2  5/2012  Bernard
9,197,260 B2  11/2015  Adnani et al.
(Continued)

FOREIGN PATENT DOCUMENTS

CN    105163340 A    12/2015

OTHER PUBLICATIONS

Viavi Solutions: "Viavi Solutions Viavi Solutions LTE-TDD Interference Analysis Using Cell Advisor", Jan. 1, 2020 (Jan. 1, 2020), XP093045275, Retrieved from the Internet: URL:https://www.viavisolutions.com/en-us/literature/lte-tdd-interference-analysis-using-celladvisor-application-notes-en.pdf [retrieved on May 9, 2023].
(Continued)

*Primary Examiner* — Tejis Daya
*Assistant Examiner* — Hector Reyes
(74) *Attorney, Agent, or Firm* — Baratta Law PLLC; Lawrence A. Baratta, Jr.

(57) ABSTRACT

A Radio Frequency (RF) spectrum analyzer includes an RF front end including a single antenna configured to monitor a wireless network that includes Time Division Duplexing (TDD); and circuitry connected to the RF front end and configured to operate and monitor the wireless network both in a spectrum analyzer mode and a signal analyzer mode, utilize the signal analyzer mode to extract synchronization information from the monitored wireless network, derive a start of frame of a radio frame from said the synchronization information; and utilize the synchronization information to identify an acquisition window to synchronize a gate in the spectrum analyzer mode.

16 Claims, 14 Drawing Sheets

(56) References Cited

U.S. PATENT DOCUMENTS

| | | | |
|---|---|---|---|
| 9,332,465 | B2 | 5/2016 | Valliappan et al. |
| 10,645,601 | B2 | 5/2020 | Kleinbeck et al. |
| 11,096,135 | B2 | 8/2021 | Hisch |
| 11,133,863 | B2 | 9/2021 | Heath et al. |
| 2003/0198304 | A1* | 10/2003 | Sugar ................. G01R 13/0254 375/340 |
| 2005/0281200 | A1 | 12/2005 | Terreault |
| 2016/0127110 | A1* | 5/2016 | McMeekin ............ H04B 1/406 370/280 |
| 2020/0136664 | A1 | 4/2020 | Goodman et al. |
| 2021/0194745 | A1 | 6/2021 | Pan et al. |
| 2021/0409106 | A1* | 12/2021 | Ashworth ............... H04L 5/143 |
| 2022/0322261 | A1* | 10/2022 | Charipadi ............. H04W 28/06 |
| 2023/0052023 | A1* | 2/2023 | Chen ....................... H04L 41/22 |

OTHER PUBLICATIONS

R&S FSW Signal and Spectrum Analyzer, Oct. 31, 2021.
Maqsood, Implementation and performance analysis of software defined radio (SDR) based LTE platform for truck connectivity application., Dec. 31, 2019.
Franci et al., An Experimental Investigation on the Impact of Duplexing and Beamforming Techniques in Field Measurements of 5G Signals, Jan. 29, 2020.
Brighton et al., INL Wireless Test Bed, Jan. 2, 2021.
Fares et al., GSM RF Equipment Testing and Performance Carrier Power offsets (kHz) level too | 200 | 250 | 400 | mota | 120010 Maximum relative level (dB) at specified carrier Analysis, Dec. 31, 2004.

\* cited by examiner

RF SPECTRUM ANALYZER FOR TDD TRANSMISSION THAT MAINTAINS SYNCHRONIZATION BETWEEN UL AND DL WITH A SINGLE ANTENNA

CROSS-REFERENCE TO RELATED APPLICATION(S)

The present disclosure claims priority to U.S. Provisional Patent Application No. 63/311,278, filed Feb. 17, 2022, and entitled "RF spectrum analyzer for TDD transmission that maintains synchronization between UL and DL with a single antenna," and to U.S. Provisional Patent Application No. 63/265,909, filed Dec. 22, 2021, and entitled "Hunting for interferences in the Uplink reserved slot of the TDD transmission," the contents of each are incorporated by reference in their entirety.

FIELD OF THE DISCLOSURE

The present disclosure generally relates to wireless networking. More particularly, the present disclosure relates to systems and methods for Radio Frequency (RF) spectrum analysis for Long Term Evolution (LTE) and 5G mobile networks, without using a Global Navigation Satellite System (GNSS) receiver.

BACKGROUND OF THE DISCLOSURE

Time Division Duplexing (TDD) is a duplexing method that splits a single carrier in timeslots for duplexing purposes. The same frequency is used for both the uplink (UL) and downlink (DL). The alternative method is Frequency Division Duplexing (FDD) where separate frequencies are used for UL and DL. There is a user need to be able to analyze the spectrum during the UL or DL timeslots, namely RF spectrum analysis which can be performed by an RF spectrum analyzer. With TDD, the RF spectrum analyzer requires synchronization between the DL and UL slots, referred to as a gated sweep method. One conventional approach includes the use of a GNSS receiver or the like in the RF spectrum analyzer for time synchronization, i.e., the RF spectrum analyzer has the same time synchronization as the base station namely a clock traceable to a same source. It presents one problem; however, the start of the radio frame is unknown. At the antenna of the base station, the start of radio frame is perfectly synchronized to Coordinated Universal Time (UTC) using 1 Pulse-per-second signal (PPS). It is also possible to recover UTC 1 PPS but the physical distance to the antenna is unknown. This distance adds delay which makes knowing the start of radio frame impossible. For solutions that use GNSS receivers, a trigger is synchronized in frequency so that there is no slip over time, but the start of radio frame is not aligned, making it more difficult to configure. Other conventional approaches trigger between the UL and DL slots some sharp transition over time. If you latch onto a sharp transition in the Power vs Time graph and the pattern does not change, there will not be a slip over time. However, the start of the frame would remain an unknown.

An RF spectrum analyzer is typically implemented as a portable device with a rechargeable battery, such as having a similar size to a tablet or laptop. In a typical wireless network, there can be a significant number of RF spectrum analyzers, such as one for each technician. A typical use case for an RF spectrum analyzer is to "hunt" or find interferers. This process can include identifying an interferer within the RF spectrum analyzer and then tracking or moving towards the interferer, which is determined based on seeing the power of the interferer increase. This process can take several minutes or hours. Conventional RF spectrum analyzers can include an extra antenna for synchronization, such as using Global Navigation Satellite System (GNSS), leading to higher costs and power (reducing battery life). Another conventional approach includes manually gating the UL and DL slots, but with a free running timebase, the gating will slip over minutes. Since it typically takes a while to find the interferer, this approach requires the technician readjust several times. As described herein, gating or a gate refers to locking the RF spectrum analyzer to a range of time for identifying power vs. time. Of note, synchronization is required such that the gate does not drift over time.

BRIEF SUMMARY OF THE DISCLOSURE

The present disclosure relates to systems and methods for Radio Frequency (RF) spectrum analysis for Long Term Evolution (LTE) and 5G mobile networks, without using a Global Navigation Satellite System (GNSS) receiver, leading to lower costs and power, and while maintaining synchronization over an extended period of time while searching or hunting for an interferer. An RF spectrum analyzer advantageously maintains a synchronization between the DL and the UL with a single antenna. The present disclosure includes synchronizing the trigger used for the gate, between DL and UL, without using a GNSS receiver. The RF spectrum analyzer device is configured to run both a Spectrum Analyzer mode and LTE/5G Analyzer mode at the same time. The LTE or 5G Analyzer mode is used to extract the boundaries of the radio frame (which is typically 10 ms), providing both frequency synchronization and radio frame synchronization. The Spectrum Analyzer mode is fed with the synchronization information from the LTE or 5G analyzer mode to be used to trigger the gate. Combining both modes makes it easier to extract synchronization directly from the signal under test. Because it is synchronized on the radio signal, the acquired spectrum provides a clearer view of potential interferences and supports hunting for these interferences in the UL or DL reserved slot of the TDD transmission. Also, because the synchronization information can be located at a different frequency than where the interference hunting is done, the synchronization location is additionally provided for acquisition of samples.

In one embodiment, the RF spectrum analyzer can alternate the acquisition of samples from the synchronization location and analysis region, spending just enough time in the sync location to discipline an internal oscillator. The internal oscillator can then be free running for a certain period of time without drifting to an unacceptable amount. In another embodiment, the synchronization location could be located within the same instantaneous bandwidth where a different method of extraction is used. In this case, the synchronization is extracted from the analysis region samples using Digital Down Conversion or Digital Up Conversion.

A Radio Frequency (RF) spectrum analyzer includes an RF front end including a single antenna configured to monitor a wireless network that includes Time Division Duplexing (TDD); and circuitry connected to the RF front end and configured to concurrently operate and monitor the wireless network both in a spectrum analyzer mode and a signal analyzer mode, utilize the signal analyzer mode to extract synchronization information from the monitored wireless network, and utilize the synchronization information to configure the spectrum analyzer mode. The radio frame synchronization is not limited to the signal under test, i.e., nothing prevents a user from configuring the sync location to be on a different base station, different frequency. As an example, during commissioning, a base station being investigated might not contain sync info. An operational base station next to it could be used for sync purpose only.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to an RF spectrum analyzer for TDD transmission that maintains synchronization between UL and DL with a single antenna. Utilizing a single antenna has the advantage of lower cost (as many spectrum analyzers may be deployed) and lower power consumption (as multiple antennas would consume more power in a portable, battery-powered device). This RF spectrum analyzer can advantageously be used to "hunt" interferers in a TDD network. Further, this approach advantageously allows use of the RF spectrum analyzer in indoor or in urban canyons where GNSS reception is impossible, limited, etc.

Figure 1:
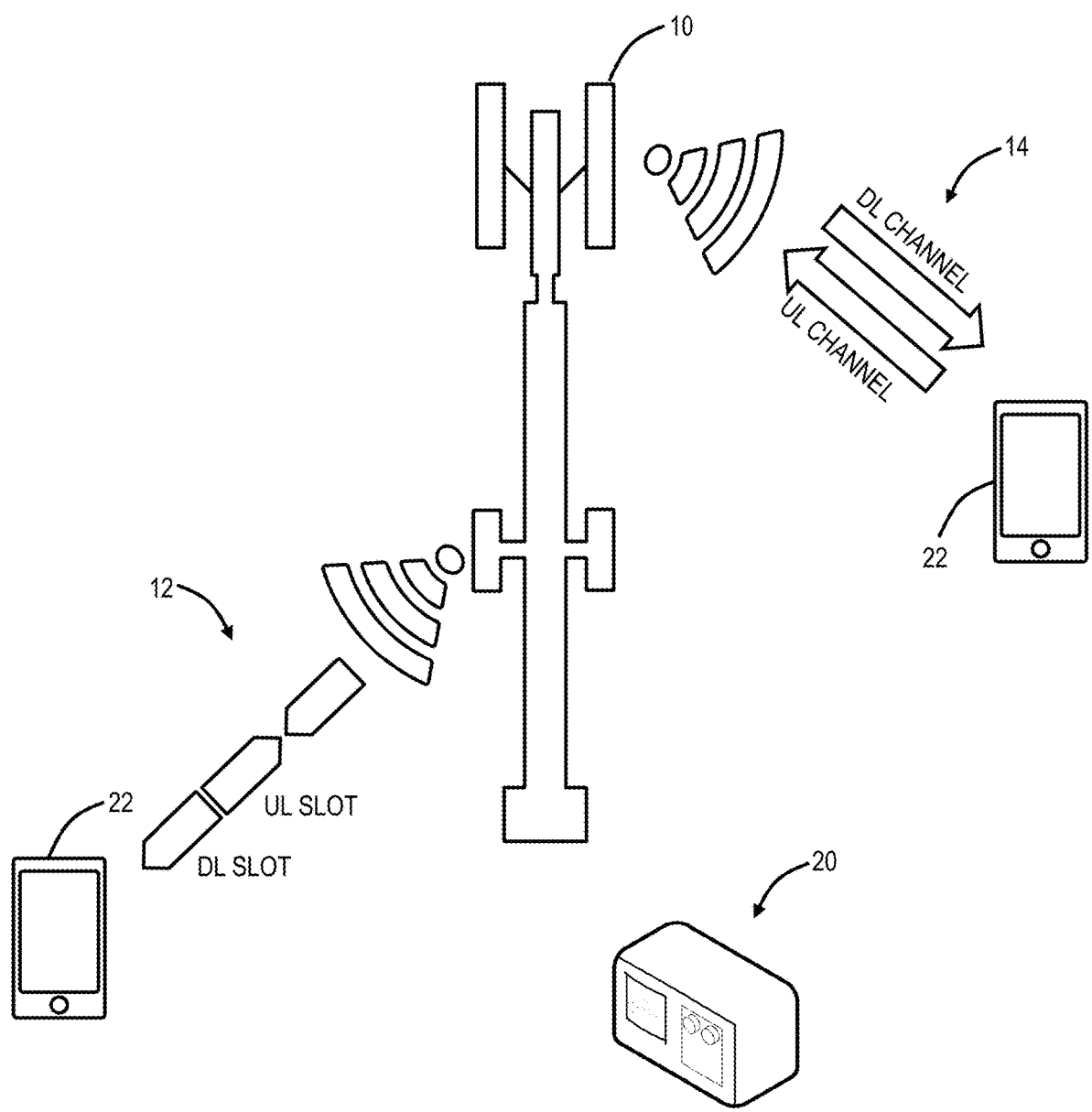
FIG. 1 is a diagram of a base station illustrating the difference between TDD and FDD.

FIG. 1 is a diagram of a base station 10 illustrating the difference between TDD 12 and FDD 14. Again, TDD is a duplexing method that splits a single carrier in timeslots for duplexing purposes. The same frequency is used for both the uplink (UL) and downlink (DL). The alternative method is FDD where separate frequencies are used for UL and DL.

The present disclosure includes an RF spectrum analyzer 20 that is configured to analyze the spectrum during the UL or DL timeslots. For both LTE and 5G New Radio (NR, a radio frame has a duration of 10 ms and for both standards, there are different types of UL/DL arrangements. Some have more UL, some more DL depending on the configuration. This arrangement can even change dynamically. Generally, when hunting for interferences, it is more useful to analyze the spectrum during the UL. During the UL, the base station 10, which normally transmits at high power, is quiet. During the UL timeslot, only user equipment (UE) 22 are transmitting, making the channel quieter as the UE 22 are not as powerful. The impact of the interferences on the spectrum is then more clearly visible. It is thus easier to hunt for interferences during UL than it is during DL or even UL/DL indiscriminate, i.e., ungated spectrum analysis.

Those skilled in the art will appreciate the RF spectrum analyzer 20 contemplates operation with radio frames of different durations, arrangements, etc., such as the standards evolve or as new standard emerge.

In a gated sweep spectrum analysis, the spectrum analyzer 20 needs to maintain a trigger every 10 ms to be in sync with the radio frame. Then, a gate is defined to include of a delay from the 10 ms trigger with a duration. The spectrum analyzer 20 will only capture samples within the gate. The user needs to configure the gate to correspond to the UL (or DL) timeslots as desired. As described herein, a gate is a locked section of spectrum that is monitored, typically an UL slot since it is easier to detect the interferer therein, but it can be a DL slot or a combination of slots.

To aid in defining the gate, a special temporary mode called power vs. time is needed. In this mode, the operation of the spectrum analyzer 20 is altered where the graph produced is not power vs. frequency but power vs. time. Samples are taken and displayed in term of power over a multiple of 10 ms graph. This is similar to the operation of an oscilloscope, but samples are taken tuned to a particular frequency and acquisition bandwidth. Some conventional devices implement what is called zero-span, a mode where only a narrow power band at the center frequency is used to create the power vs. time graph.

Figure 2A:
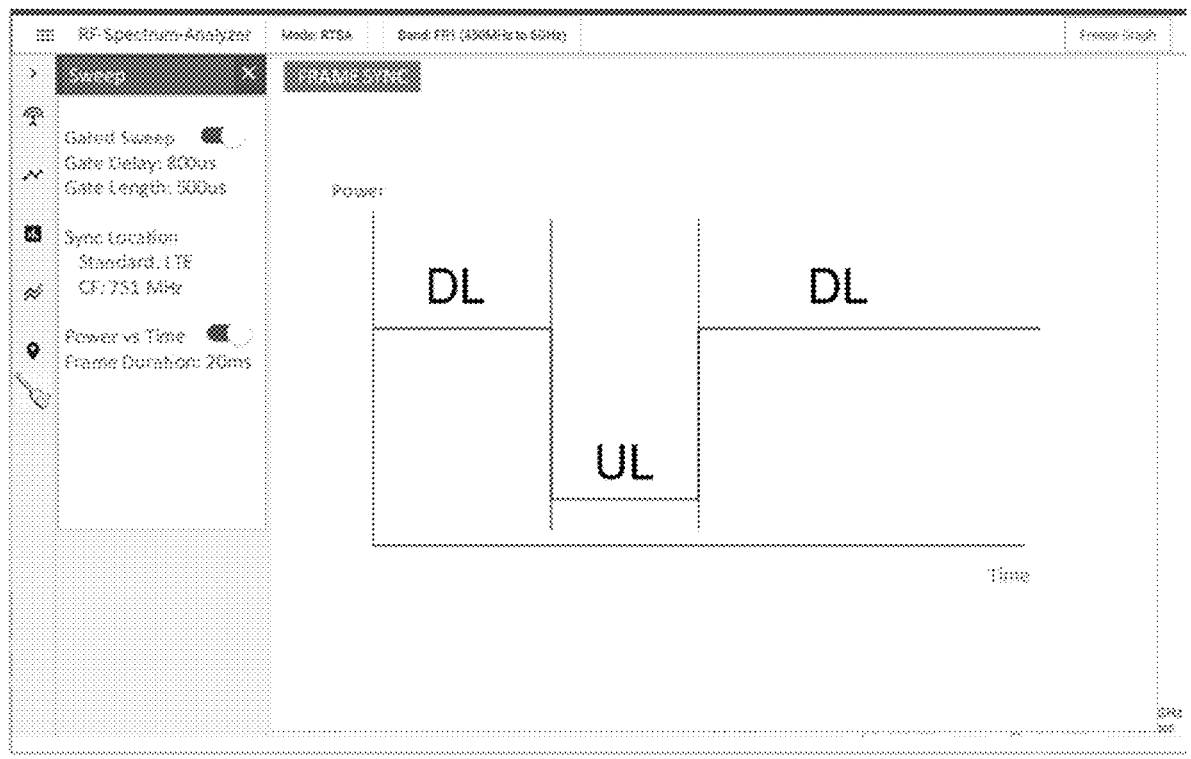
FIG. 2A is a graph that represents the radio frame where the UL and DL slots are discernable, in TDD transmission.

This produces a graph that represents the radio frame where the UL and DL slots are discernable. The user is then able to configure a gate delay and length over the timeslot of interest. This is illustrated in FIG. 2A. Once the gate is configured, the power vs. time graph mode is reverted back to normal spectrum analyzer mode but samples are taken only inside the gate.

It may be difficult to synchronize the trigger for the gate to the radio signal. With an internally generated timebase that is not synchronized to the timebase of the base station 10 generating the radio frame, following a drift between the clocks, a desynchronization eventually occurs after a certain amount of time and the gate is no longer located where the user wanted it. This makes measurement of the TDD signal a run against the clock where the user needs to quickly do his measurements while the gate is synchronized. Otherwise, he needs to repeat the synchronization steps in the power vs. time mode to readjust the gate.

Not only is the spectrum analyzer 20 not synchronized in frequency to the base station 10 but it is also not synchronized in relation to the radio frame. The start of the radio frame is unknown in such situation. Depending on the generation of the 10 ms trigger, the offset in generating this trigger vs. the start of radio frame is random. It has the effect of having a power vs. time graph that will have the start of radio frame vary from one use to the other.

It is an imperative requirement for base stations 10 to be synchronized together to a traceable clock source. The solution used for that is either have a GNSS receiver at the base station 10 so time and frequency reference are provided or have a central GNSS receiver(s) and distribute the clock using IEEE 1588 Precision Time Protocol (PTP) to the base stations 10. In both cases, the base station 10 has a clock source that is traceable to an atomic clock and has time of day with a 1 PPS signal that is synchronized in phase to UTC. We can assume that base stations 10 have a very stable and reliable source of clock.

RF Spectrum Analyzer Modes

In normal operation of the spectrum analyzer 20, two modes are available, namely a spectrum analyzer mode and an LTE/5G signal analyzer mode. These can be generally referred to as a spectrum analyzer mode and a signal analyzer mode. In the spectrum analyzer mode, we take samples at a tuned frequency and process them with a Fast Fourier Transform (FFT) and other to create a power vs. frequency spectrum. In 5G New Radio (NR) analyzer or LTE signal analyzer mode, we take samples at a particular frequency to derive specific metrics on the radio signal. We have to be tuned to the radio signal the same way a UE does and synchronized to it and have to demodulate specific information, namely the primary synchronization signal (PSS) and secondary synchronization signal (SSS). These signals are present to help the UE find the start of the radio frame. These signals repeat every 5 ms in LTE and in some multiples of 5 ms in 5G NR (5, 10, 20, 40, 80 and 160 ms). In all cases, knowing the position of the PSS, it is possible to precisely derive the boundaries of the 10 ms radio frame.

The present disclosure includes running both spectrum analyzer mode and the signal analyzer mode at the same time in the spectrum analyzer 20, depending on the radio standard used. The signal analyzer mode is used to extract the boundaries of the 10 ms radio frame, providing radio frame synchronization. The spectrum analyzer mode is fed with the sync information from the signal analyzer mode to be used to trigger the gate. Combining both the spectrum analyzer mode and the signal analyzer mode makes it easier to extract synchronization directly from the signal under test. Because it is synchronized on the radio signal, the acquired spectrum provides a clearer view of potential interferences and supports hunting for these interferences in the UL reserved slot of the TDD transmission. This is one advantage of the present disclosure.

Frequency synchronization is achieved through a two-step approach where the frequency offset is first measured through cyclic-prefix correlation and then the offset gets corrected by shifting the input signal frequency (by the amount of the measured offset) through a complex mixer. This frequency synchronization process is performed prior to frame synchronization. This is true for both 5G and LTE.

The RF spectrum analyzer 20 includes an RF front end that includes an antenna and associated circuitry and functionality. As will be understood, the RF front end that is used to take the sample of signal tuned at a particular frequency is tuned to a single frequency requiring both the spectrum analysis range and the PSS/SSS signals to fall within the instantaneous bandwidth of the receiver. Although this works for certain situations, this can be inconvenient in other situations. In one embodiment, different sync and center frequencies could be supported without frequency switching if they happened to be in the same 100 MHz range (or smaller with decimation), such as where the RF spectrum analyzer had 100 MHz bandwidth. Of course, those skilled in the art will recognize an embodiment of the RF spectrum analyzer can have more or less instantaneous bandwidth.

Figure 2B:
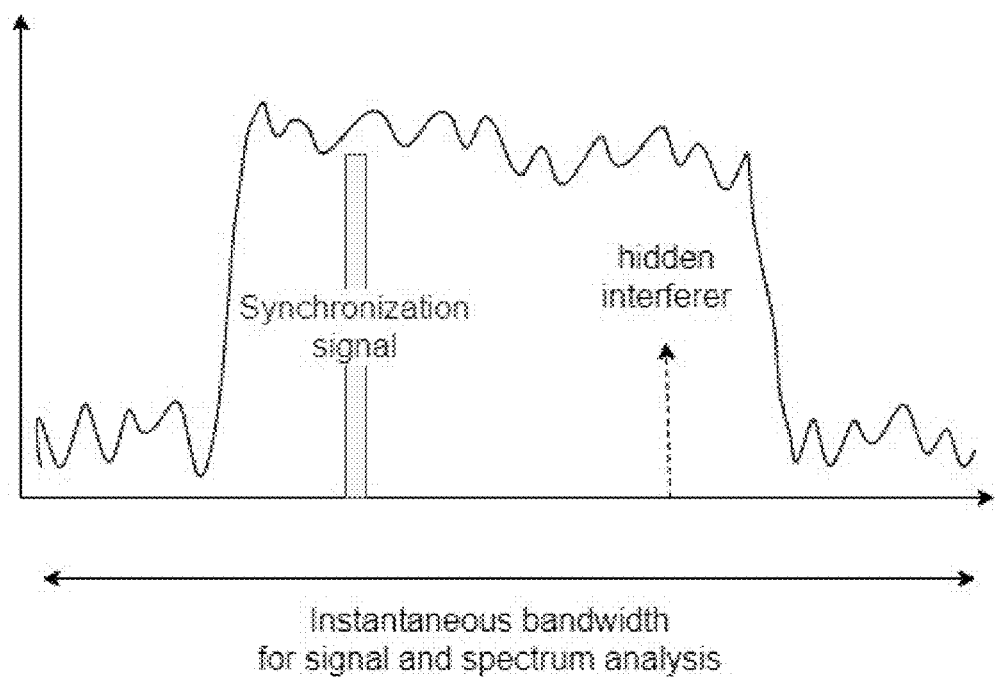
FIG. 2B is a graph showing a SSB (Synchronization Signal Block) being in a same instantaneous bandwidth as an analysis region (where there can be a hidden interferer).
Figure 2C:
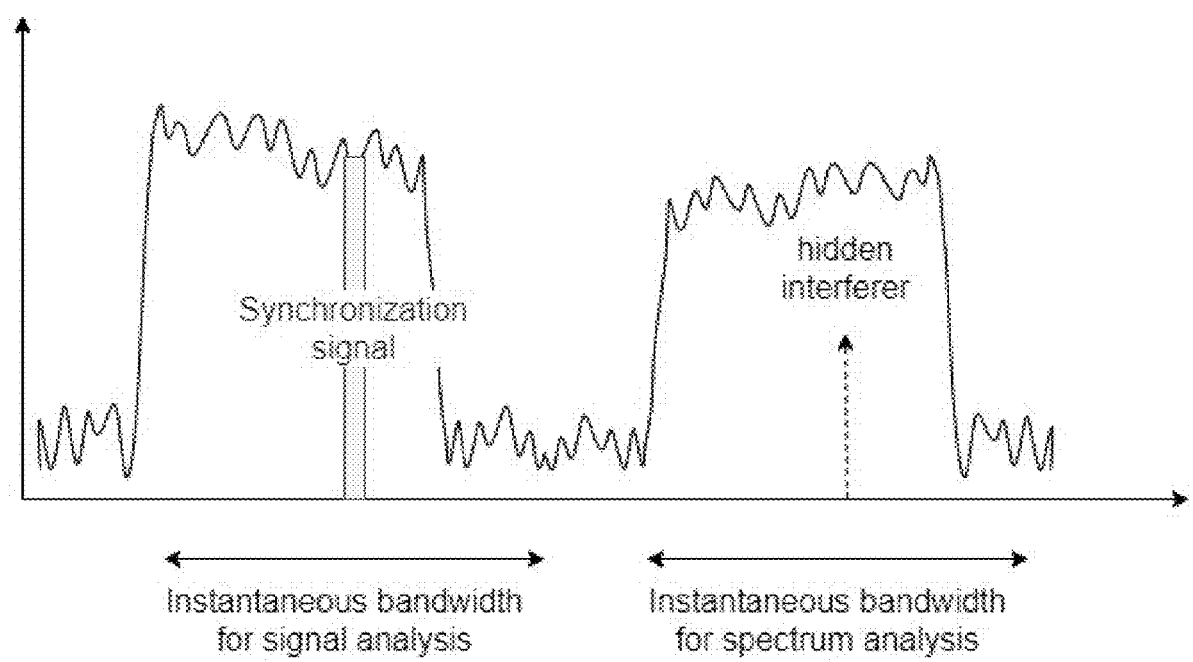
FIG. 2C is a graph showing the SSB being in a different instantaneous bandwidth as the analysis region.

FIG. 2B is a graph showing a SSB (Synchronization Signal Block) being in a same instantaneous bandwidth as an analysis region (where there can be a hidden interferer). FIG. 2C is a graph showing the SSB being in a different instantaneous bandwidth as the analysis region. Of note, a practical implementation of the RF spectrum analyzer 20 will have a set instantaneous bandwidth, e.g., 100 MHz. The present disclosure contemplates operation in either scenario, FIG. 2B or 2C. Of note, FIG. 4B is a diagram of operation of the RF spectrum analyzer where the SSB is in the same instantaneous bandwidth as an analysis region, as in FIG. 2B. FIG. 4C is a diagram of operation of the RF spectrum analyzer where the SSB is in a different instantaneous bandwidth as the analysis region, as in FIG. 2C.

Figure 3:
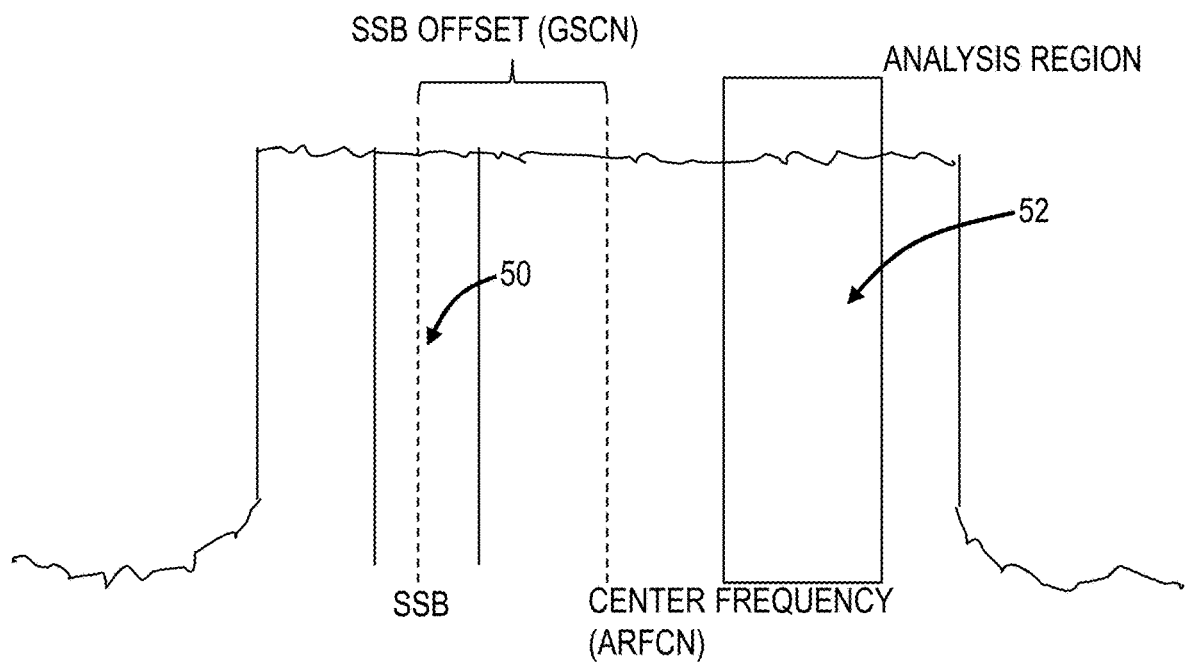
FIG. 3 is a graph illustrating a constraint where an interferer to be hunted for is not located where the PSS/SSS is located.

FIG. 3 is a graph illustrating a constraint where an interferer to be hunted for is not located where the PSS/SSS is located, such as in FIG. 2C. In the case of 5G, the PSS/SSS is located in what is called a SSB (Synchronization Signal Block), i.e., a sync location 50. In the case of FIG. 3, the sync location is not at the same place as an analysis region 52. The same can apply to LTE, the difference is with LTE, the PSS/SSS is always located at the center frequency of the carrier.

The analysis region 52 is configured as usual in the spectrum analyzer 20 but the sync location is additionally provided (entered manually or searched with an automated tool from within the instrument). It may also be necessary to configure the sensitivity of the receiver (Low Noise Amplifier (LNA) and/or attenuation) to allow for the difference in signal level between UL and DL or the difference between a sync location on a different carrier than where the analysis is performed. This is done by comparing the signal power in the PSS portion at the sync frequency with a target range. The sensitivity adjustment also takes into account if the signal is strong enough to be decoded or if it is saturated.

LTE and 5G frame synchronization based on strongest detected PSS/SSS (strongest SSB beam for 5G), Methods to achieve start-of-frame synchronization differ whether the wireless network is LTE or 5G. In LTE, the system looks for a pair of synchronization signals—the PSS and SSS—that are transmitted twice in each 10 ms frame (each PSS/SSS pair is separated by 5 ms from each other). PSS/SSS detection is achieved through correlation techniques. An LTE receiver can identify which pair it has detected (the first transmitted near the beginning of the frame or the second 5 ms later) by looking at the encoding of the SSS signal which is different for each pair within the frame. The relative distance between each PSS/SSS signal pair to the start-of-frame is constant (the same across all LTE networks in the world) and therefore deriving the start-of-frame is just a matter of applying a timing offset to the moment PSS/SSS pair has been detected. Many PSS/SSS pairs can be received from many base stations, our implementation synchronizes to the received pair with the strongest correlation strength. In NR the sync signals are bundled in a structure called SSB which contains the PSS and SSS signals (that are similar to LTE but not the same) and a third signal called PBCH. SSBs are transmitted in bursts where each burst can contain up to 64 SSBs and where each SSB is associated to a radiation beam. Each SSB/beam is also associated to a specific index that is encoded in the PBCH and which is unique within the frame. The NR protocol specifies the location of each SSB/beam relative to the start-of-frame through simple mathematic rules classified in 5 cases (a, b, c, d and e) using the SSB/beam index, the subcarrier spacing of the NR signal and its center frequency as inputs. The NR receiver determines the location of the start-of-frame relative to the moment a SSB has been detected and demodulated by applying a timing offset derived from these rules. As with LTE, many SSB bursts can be detected from many base stations, our implementation synchronizes to the received SSB with the strongest correlation strength. Further offsets can be applied to the start-of-frame to compensate optional DSP processing steps such as decimation. Once an LTE/NR start-of-frame is detected, an internal free-running 10 ms frame pulse gets synchronized to it and the acquisition window determined using the gate delay and gate length information.

Having both locations defined, and when the sync location 50 is not located within the instantaneous bandwidth as the analysis region 52, it is now possible to alternate the acquisition of samples from the sync location 50 and the analysis region 52, spending just enough time in the sync location 50 to discipline an internal oscillator (i.e., perform corrections on the internal oscillator until over time it matches the reference signal frequency). After being disciplined, this internal oscillator can then be free running for a certain period of time without drifting to an unacceptable amount. This frees up the RF front end to return to the analysis region 52 and capture samples there for spectrum analysis.

Based on careful characterization of the internal oscillator, it is possible to determine how frequently a redisciplining is needed. This will result in a temporary pausing of spectrum analysis in order for the LTE or 5G Analyzer to tune to the sync location and re-align the phase and frequency of the start of radio frame. The above mode of operation causes periodic short pauses in the spectrum analysis but compared to the prior art does not require any additional synchronization circuitry. When the sync location 50 falls within the instantaneous bandwidth of the analysis region 52, alternate acquisition is not needed as the sync information is contained in the samples although not at the center frequency. In this case, an additional step is required: Digital Down Conversion or Digital Up Conversion depending on whether the sync location is above or below the center frequency respectively. Digital Down/Up Conversion is a digital signal processing technique used to shift the frequency of the sample signal. The resulting signal is fed to the signal analyzer for synchronization extraction. An original unmodified copy of the samples is fed directly to the Spectrum Analyzer. When the sync location 50 is exactly at the same frequency as the analysis region 52, Digital Down/Up Conversion is not needed. The signal analyzer can extract sync information from the samples directly.

A single configuration of the gate in the power vs. time graph allows continuous operation in gated sweep spectrum analyzer operation without the fear of having the gate slipping. Since base stations 10 are synchronized, this advantage can be gained whether or not the sync location 50 and the analysis region 52 emanate from the same base station 10, i.e., the spectrum analyzer 20 can derive a precise timebase from a neighboring powerful base station while gating on the transmission pattern of another one. The difference in propagation delay between the spectrum analyzer and both base stations will create a time offset that will induce a small error in the start of radio frame position. It is even possible to extract the sync location from a radio standard (e.g., LTE) and analyze a different one (a 5G NR signal). Such a situation can occur for example in the 5G non-standalone context where LTE is the anchor and 5G is used for traffic only.

The system advantageously maintains a synchronization between the DL and the UL with a single antenna.

Demodulation allows to get the start-of-frame. With a good timebase, slippage is not significant between synchronization steps. We can optionally discipline the internal reference to get a precise timebase or extend the period between synchronization steps. The power vs. time graph would not be aligned precisely with the start of frame, but it would not slip significantly.

Advantageously with the present method, the start of radio frame is located at the origin in the power vs. time graph, used to define the gate. This can be useful in case the downlink is not busy and the difference between the DL and UL is not obvious.

Again, this ability to maintain synchronization with a single antenna includes advantages such as lower cost, lower power, better battery life, etc. Also, this enables indoor use of the RF spectrum analyzer. Indoor usage is as an important use case. 5G radiowaves in the mmWave band do no penetrate objects. Thus, deployment of 5G requires base stations to be installed indoor to maintain coverage as the waves from an outdoor base station do not penetrate indoor. GNSS reception is impossible inside a building giving our solution a clear advantage.

Process

Figure 4A:
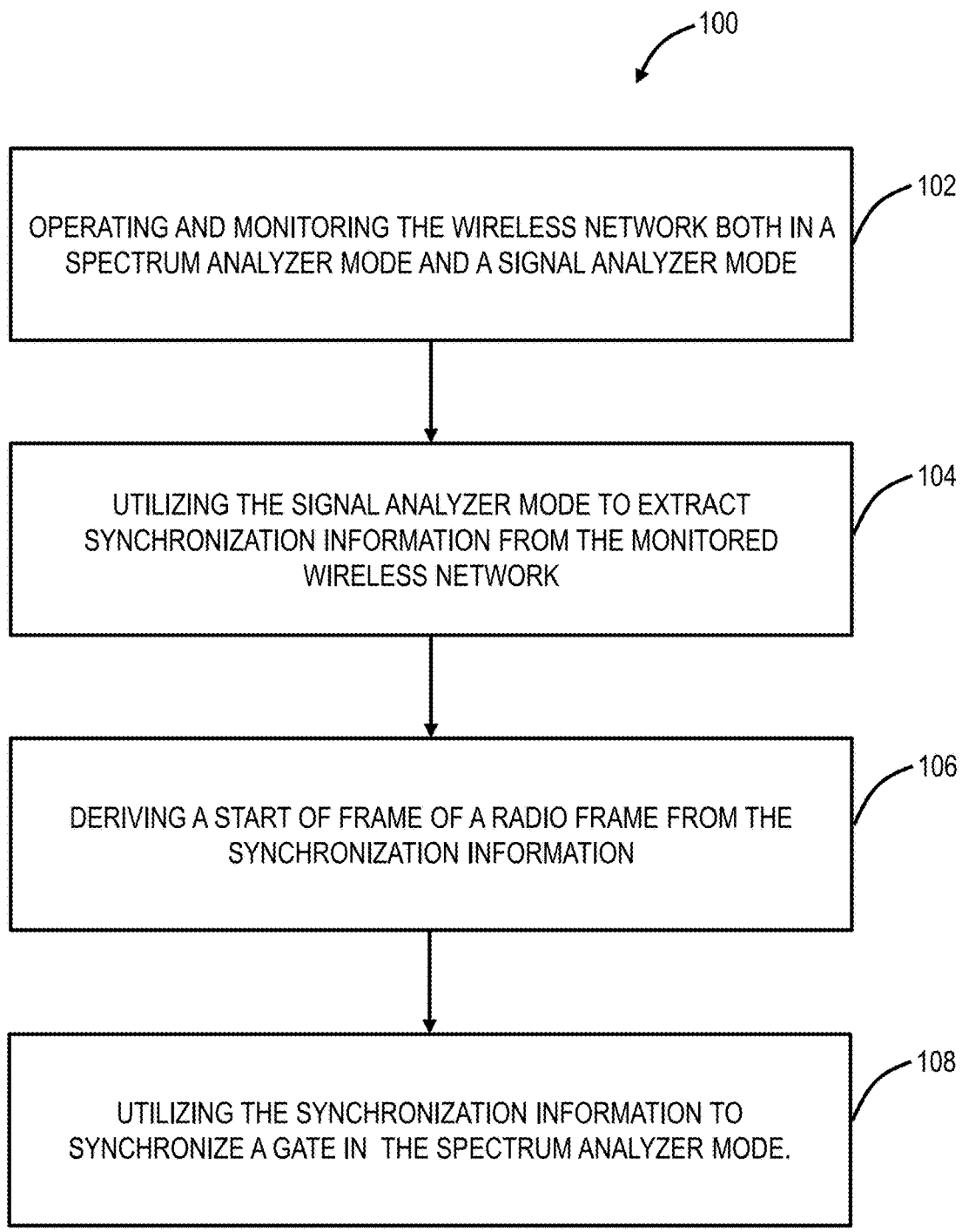
FIG. 4A is a flowchart of a process for operating the RF spectrum analyzer for TDD transmission while maintaining synchronization between UL and DL with a single antenna.
Figure 4B:
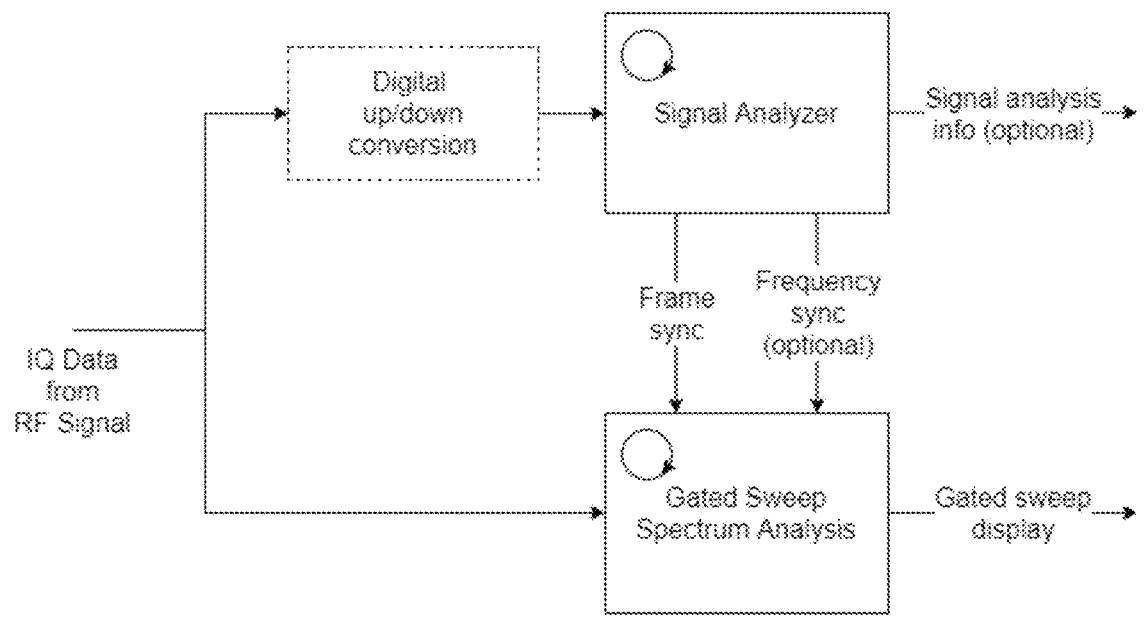
FIG. 4B is a diagram of operation of the RF spectrum analyzer where the SSB is in the same instantaneous bandwidth as an analysis region, as in FIG. 2B.
Figure 4C:
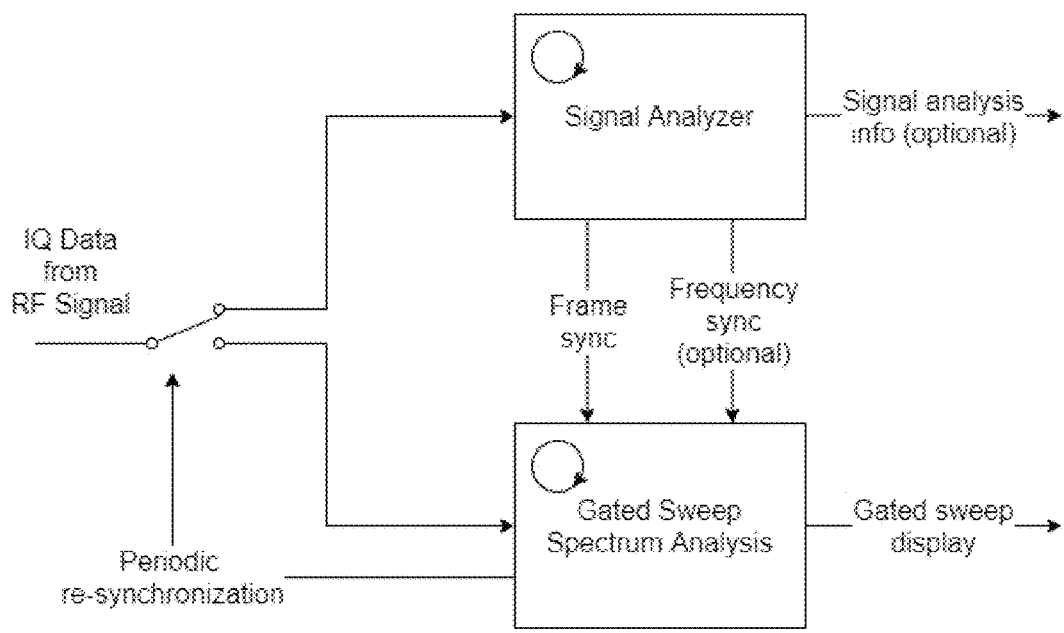
FIG. 4C is a diagram of operation of the RF spectrum analyzer where the SSB is in a different instantaneous bandwidth as the analysis region, as in FIG. 2C.

FIG. 4 is a flowchart of a process 100 for operating the RF spectrum analyzer 20 for TDD transmission while maintaining synchronization between UL and DL with a single antenna. In various embodiments, the process 100 can include a method having steps, a system including at least one processor and memory with instructions that, when executed, cause the at least one processor to implement the steps, and a non-transitory computer-readable medium having instructions stored thereon for programming at least one processor to perform the steps, circuitry configured to execute the steps, etc.

The process 100 can be implemented in a Radio Frequency (RF) spectrum analyzer with an RF front end including a single antenna configured to monitor a wireless network that includes Time Division Duplexing (TDD). The process 100 includes operating and monitoring the wireless network both in a spectrum analyzer mode and a signal analyzer mode (step 102); utilizing the signal analyzer mode to extract synchronization information from the monitored wireless network (step 104); deriving a start of frame of a radio frame from the synchronization information (step 106); and utilizing the synchronization information to synchronize a gate in the spectrum analyzer mode (step 108).

The synchronization information can include any of frequency synchronization and radio frame synchronization. The process 100 can further include utilizing a free running timebase that is periodically updated based on the synchronization information. The synchronization information is used to establish a precise timebase and/or to extend a time between synchronization of the timebase. The RF spectrum analyzer has a timebase (i.e., clock) that can be free-running and/or synchronized using frequency synchronization ("disciplining the reference timebase"). The frame synchronization is used to align time 0 of the periodic gate with the beginning of the radio frame. Imagine two analog clocks, namely frequency synchronization making sure the second hands of both clocks move at the same rate, regardless of the actual time they display, and radio frame synchronization making sure they both show 12 am at the same time. It is possible to do either, or both.

The single antenna is configured to monitor uplink and downlink slots. For example, a sync location and an analysis region can be configured by the user and used for a gate, and the synchronization information is used to keep synchronization. The RF front end can be tuned to a single frequency within a range of an analysis region for spectrum analysis and a sync location that includes any of primary synchronization signal (PSS) and secondary synchronization signal (SSS).

The process 100 can further include alternating sample acquisition between a synchronization location and an analysis region, when an analysis region for spectrum analysis and a sync location that includes any of primary synchronization signal (PSS) and secondary synchronization signal (SSS) are in different locations.

The wireless network can include any of 5G and Long Term Evolution (LTE). The synchronization information can be from a different standard than the spectrum analyzer mode operates. The process 100 can further include hunting for interferences in an uplink (UL) reserved slot of the TDD.

Example RF Spectrum Analyzer

Figure 5:
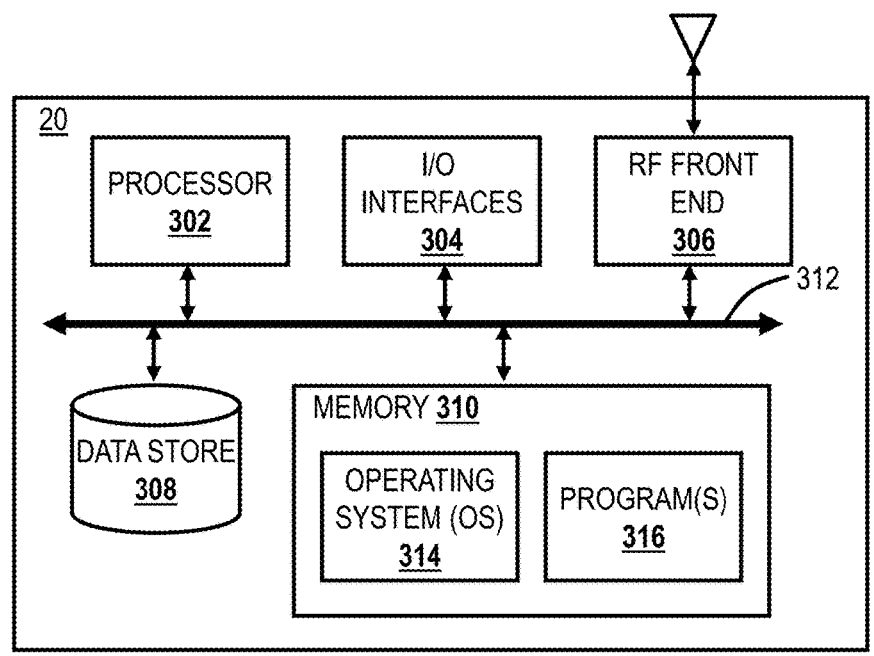
FIG. 5 is a block diagram of an example embodiment of the RF spectrum analyzer.

FIG. 5 is a block diagram of an example embodiment of the RF spectrum analyzer 20. The RF spectrum analyzer 20 can be a digital device that, in terms of hardware architecture, generally includes a processor 302, I/O interfaces 304, an RF front end 306, a data store 308, and memory 310. It should be appreciated by those of ordinary skill in the art that FIG. 5 depicts the RF spectrum analyzer 20 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the RF spectrum analyzer 20, a semiconductor-based microprocessor (in the form of a microchip or chipset), or generally any device for executing software instructions. When the RF spectrum analyzer 20 is in operation, the processor 302 is configured to execute software stored within the memory 310, to communicate data to and from the memory 310, and to generally control operations of the RF spectrum analyzer 20 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The RF front end 306 enables wireless communication to monitor a wireless network, such as the base station 10. Any number of suitable wireless data communication protocols, techniques, or methodologies can be supported by the network interface 306, including any protocols for wireless communication. Of note, the RF front end 306 specifically contemplates monitoring TDD communication in LTE, 5G, and the like. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 5, the software in the memory 310 includes a suitable operating system 314 and programs 316. The operating system 314 essentially controls the execution of other computer programs and provides scheduling, input-output control, file and data management, memory management, and communication control and related services.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

As can be appreciated, having a single antenna provides cost reduction and power reduction while also supporting full synchronization. Cost reduction is important as a typical network provider has a need for a significant number of RF spectrum analyzers, such as one for each field technician. Power reduction is important as these are mobile devices utilizing a battery. The full synchronization is important as the process of hunting for an interferer takes a while, and this enables the field technician to focus on the power vs. time graph with the interferer, avoiding a need to manually gate the analysis region because the timebase in the RF spectrum analysis is free running. Also, extracting sync from the radio signal gives the advantage of being usable indoor where GNSS reception is not possible.

Example Process of Hunting for an Interferer

Figure 6:
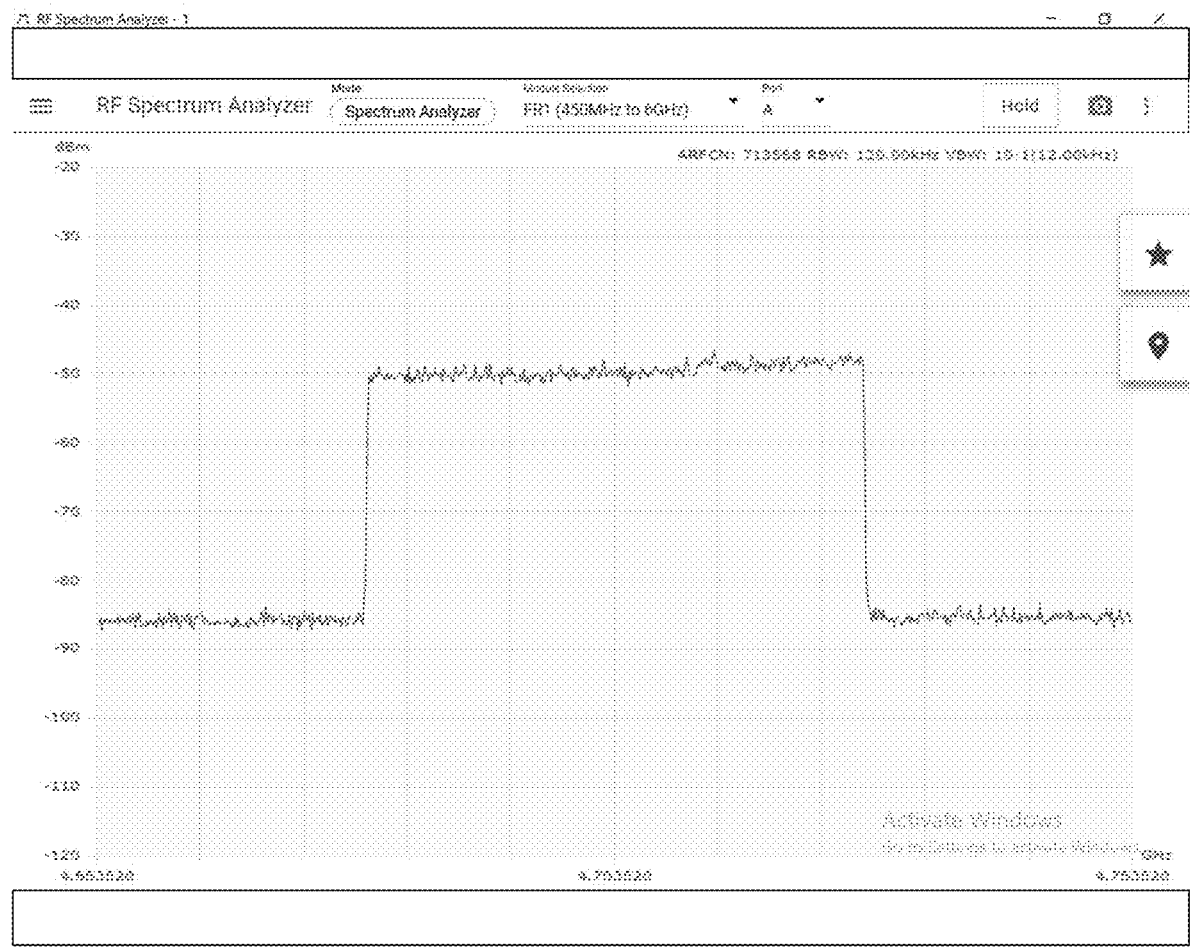
FIGS. 6 to 12 are screenshots from an RF spectrum analyzer illustrating a process of hunting an interferer.

FIGS. 6 to 12 are screenshots from an RF spectrum analyzer 20 illustrating a process of hunting an interferer. FIG. 6 is a power vs. frequency graph of a 5G TDD carrier centered on 4.703520 GHz transmitted by a base station. In this carrier there is a SSB somewhere containing the synch. There is also an interferer that we cannot see because its power is lower than the base station transmit power.

Figure 7:
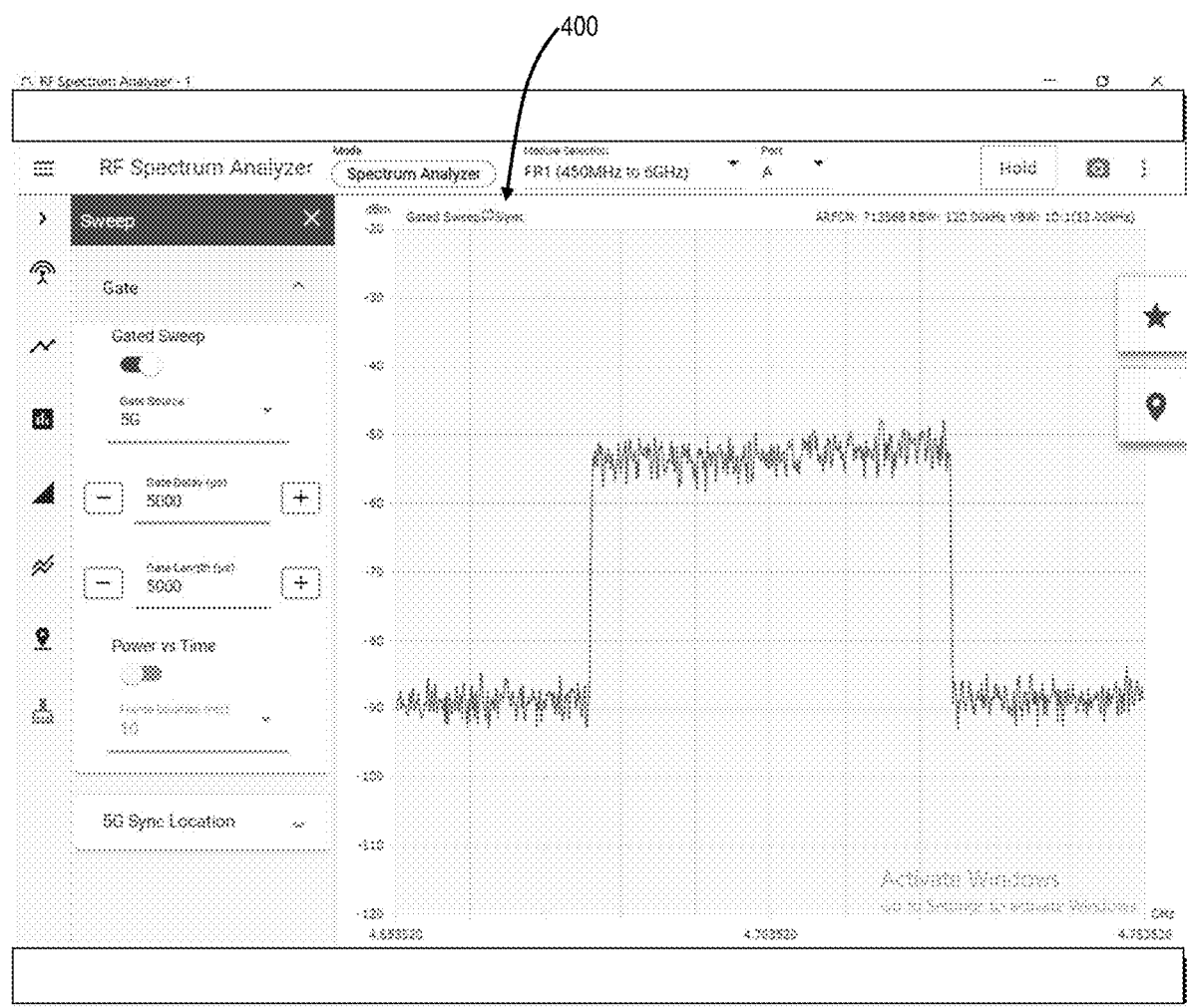
Figure 8:

In FIG. 7, which is also a power vs. frequency graph, the first step is to go to a sweep menu where the gated sweep configuration is located. A gated sweep is turned on, but it does not change anything because the gate is not synchronized and encompasses both downlink and uplink. A sync status 400 is shown on the top of the graph, indicating no sync.

In FIG. 8, again which is a power vs. frequency graph, the second step is to set parameters of the sync location, to tell the instrument where to look for the SSB (synchronization). In this case, it is done using the GSCN (Global Synchronization Channel Number) of 8672 which corresponds to a frequency of 4.689120 GHz. So the SSB is located on the left side of the carrier (left of the center frequency) in FIG. 8. The sync status 400 is turned green on top of the graph to indicate sync was found. Configuration of the sync location is either manual when the GSCN is known or an automated tool within the instrument can be used to scan for the presence of PSS/SSS at synchronization rasters.

Figure 9:
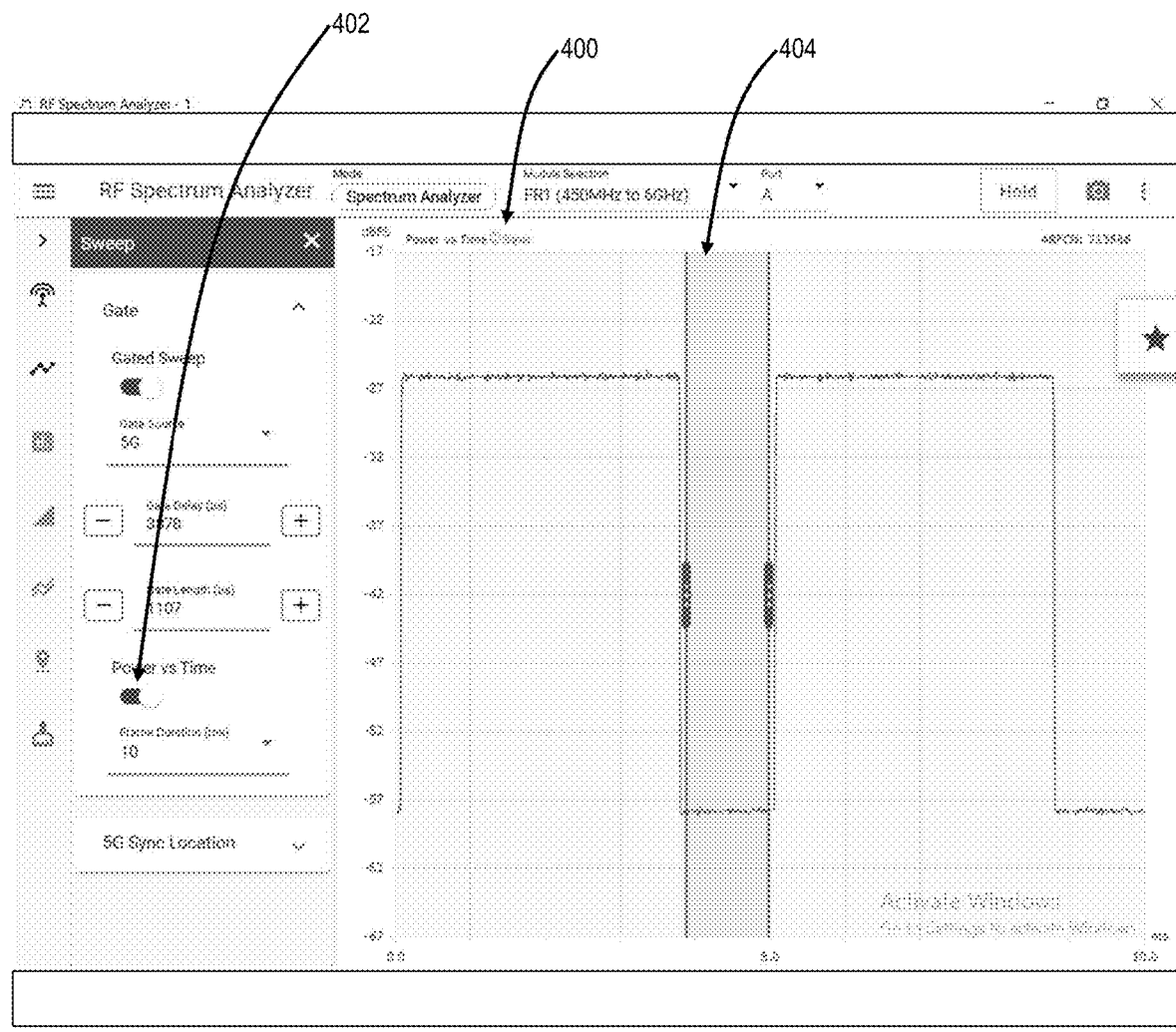

In FIG. 9, which is a power vs. time graph, the next step is to turn on a power vs. time selection 402. So instead of showing a power vs frequency graph, a power vs time graph is shown where the X axis is the length of a radio frame, e.g., 10 ms. And because it is synchronized to the radio frame, it is possible to draw the radio frame starting at exactly 0ms. The high-power portion of the graph represent DL slots (from 0 to about just before 4 ms, and again from after 5 ms to just before 9 ms). The low power portion is UL (just before 4 ms to just after 5 ms and again from just before 9 ms to 10 ms). Using onscreen tool, a gate 404 can be adjusted to be in one of the UL portion, from 3878 µs and last 1107 µs.

Figure 10:
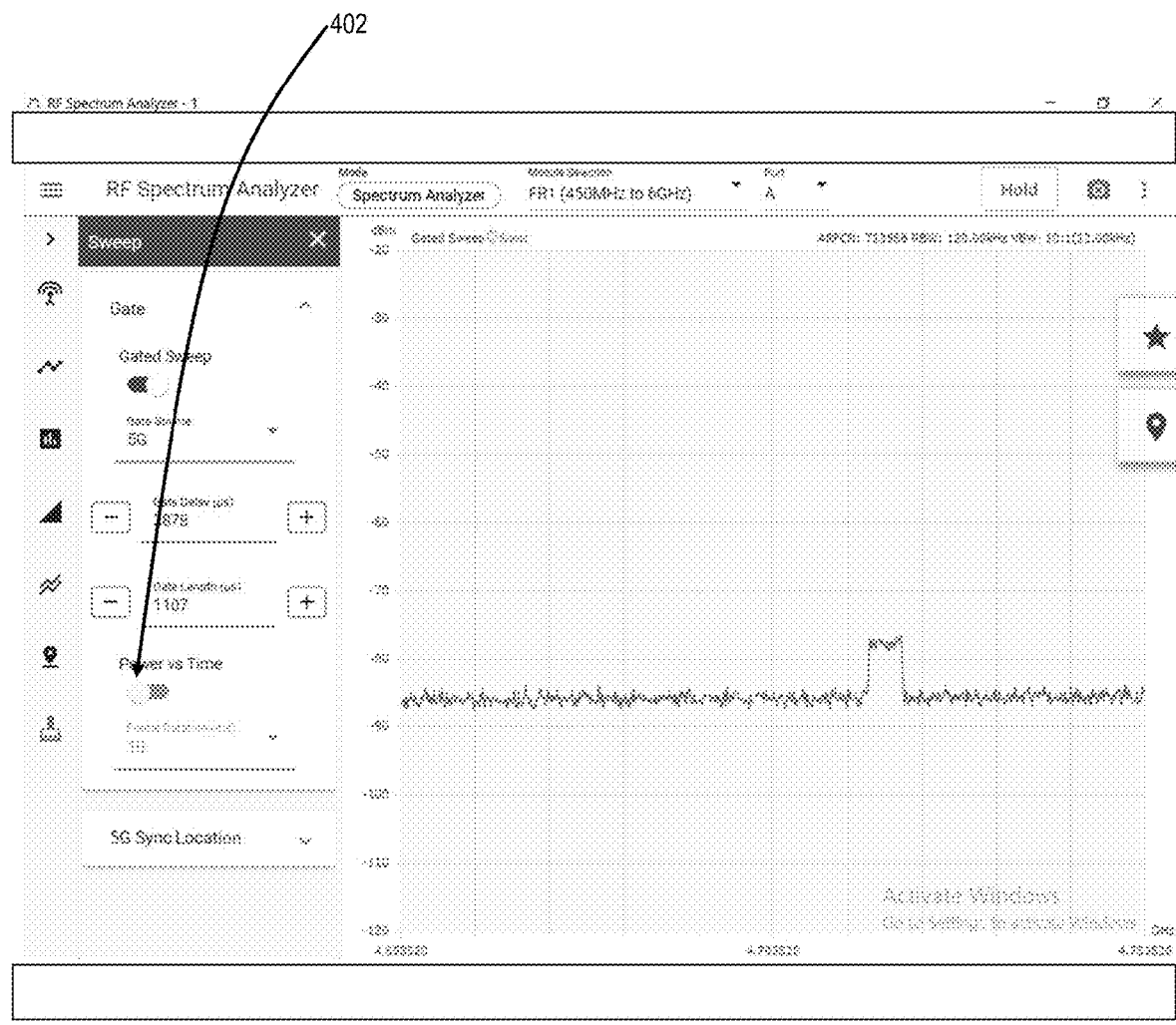

In FIG. 10, which is a power vs. frequency graph, now with the gate configured, the user switches back to power vs. frequency by turning OFF the power vs. time selection 402. The spectrum analyzer 20 in this case will only capture samples within the defined gate, which falls in the UL slots. In these slots, the base station does not transmit making it quiet and easier to see interferer that were lower than the powerful base station signal. We see the interferer somewhere on the right side of the center.

Figure 11:
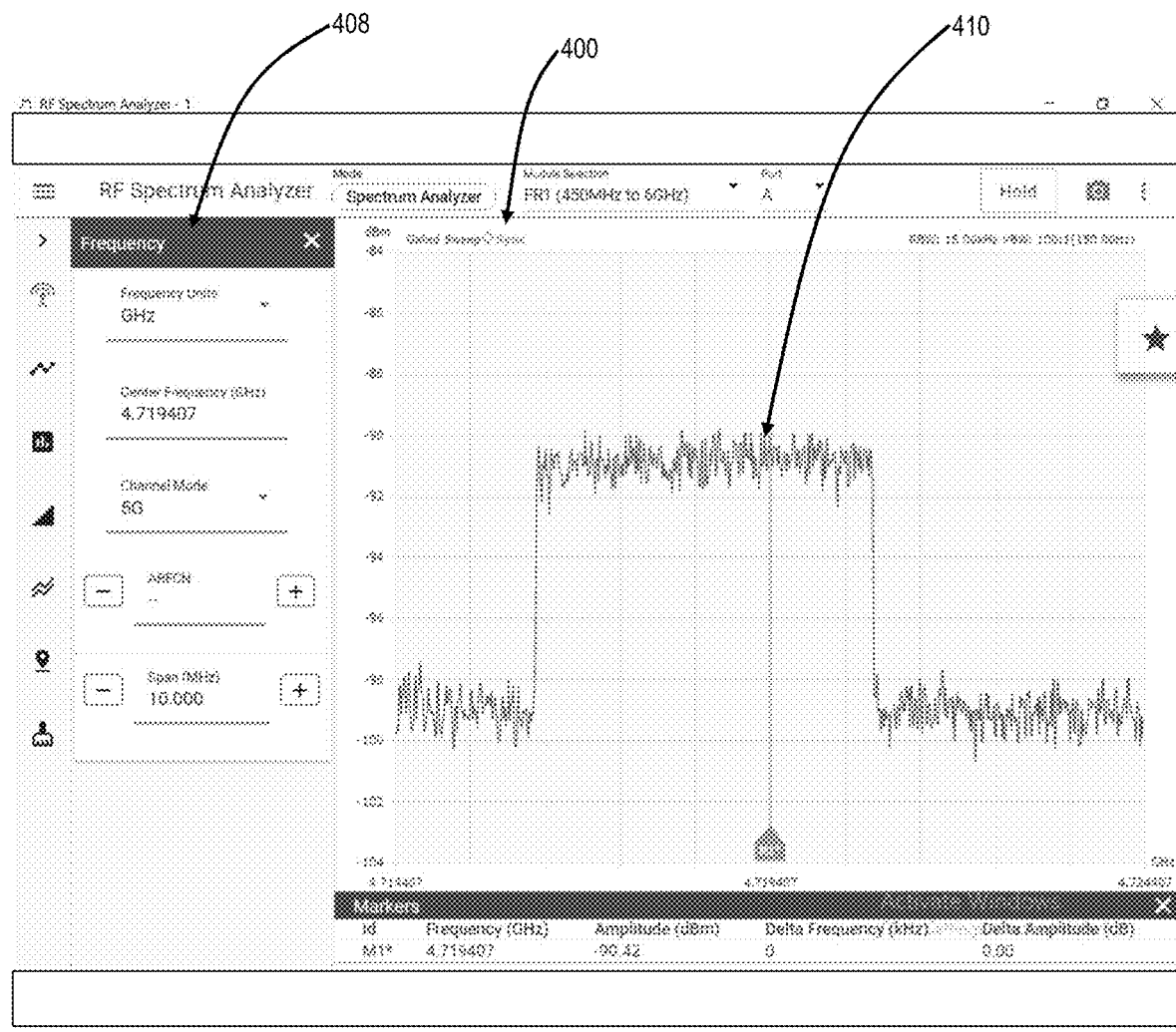

In FIG. 11, which is a power vs. frequency graph, using frequency and amplitude controls 408 of the spectrum analyzer 20, it is possible to zoom-in on that interferer 410 to see more details. Here the center frequency was changed to the interferer, the span was reduced from 100 MHz to 10 MHz and the amplitude was adjusted to maximize the view. All that while maintaining the synchronization as proven by the green sync status 400.

Figure 12:
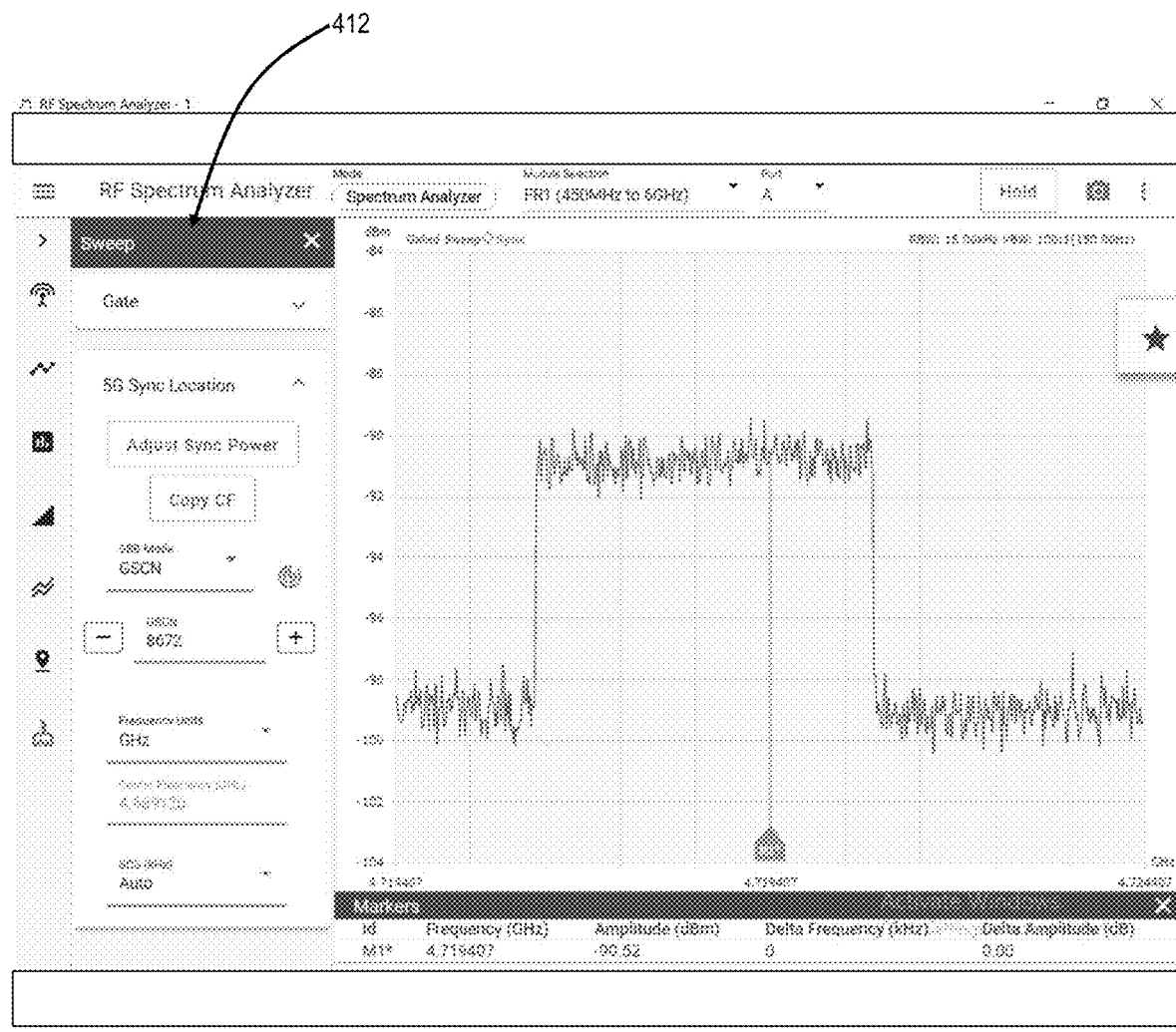

In FIG. 12, which is a power vs. frequency graph, going back to a sweep menu 412 where the sync Location config is located, we see that the SSB is still at GSCN 8672, frequency 4.689120 GHz. It is important to note that the Sync Location frequency is falling outside of the currently displayed span. The current power vs frequency graph span from 4.714407 to 4.724407 GHz while the sync is at 4.689120 GHz, not even shown on the graph. Nonetheless, the sync is maintained because of the alternating tuning between analysis region (the graph) and SSB (sync location).

CONCLUSION

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A Radio Frequency (RF) spectrum analyzer comprising:
 an RF front end including a single antenna configured to monitor a wireless network that includes Time Division Duplexing (TDD); and
 circuitry connected to the RF front end and configured to
  operate and monitor the wireless network both in a spectrum analyzer mode and a signal analyzer mode,
  utilize the signal analyzer mode to extract synchronization information from the monitored wireless network,
  derive a start of frame of a radio frame from the synchronization information; and
  utilize the synchronization information to synchronize a gate in the spectrum analyzer mode,
  wherein, (i) when a frequency of any of primary synchronization signal (PSS) and secondary synchronization signal (SSS) are at same frequencies as an analysis region, the RF font end is tuned to a single frequency within a range of the analysis region for spectrum analysis, or (ii) when the frequency of any of the PSS and the SSS are not within an analysis region, the circuitry concurrently operates by alternating sample acquisition between a synchronization location and the analysis region, the recover the frequency of any of the PSS and the SSS.

2. The RF spectrum analyzer of claim 1, wherein the synchronization information includes any of frequency synchronization and radio frame synchronization.

3. The RF spectrum analyzer of claim 1, wherein the circuitry includes a free running timebase that is periodically updated based on the synchronization information.

4. The RF spectrum analyzer of claim 1, wherein the synchronization information is used to establish a precise timebase and/or to extend a time between synchronization of the timebase.

5. The RF spectrum analyzer of claim 1, wherein the single antenna is configured to monitor one of uplink and downlink slots based on configuration from the synchronization information.

6. The RF spectrum analyzer of claim 1, wherein, when the frequency of the any of PSS and the SSS are in an analysis region, but not exactly at a center frequency of the analysis region, the circuitry is configured to recover the frequency of the any of the PSS and the SSS is using one of a digital up converter and a digital down converter.

7. The RF spectrum analyzer of claim 1, wherein the wireless network includes any of 5G and Long Term Evolution (LTE).

8. The RF spectrum analyzer of claim 1, wherein the synchronization information is from a different standard than the spectrum analyzer mode operates.

9. The RF spectrum analyzer of claim 1, wherein the circuitry is further configured to hunting for interferences in an uplink (UL) reserved slot of the TDD.

10. A method implemented in a Radio Frequency (RF) spectrum analyzer with an RF front end including a single antenna configured to monitor a wireless network that includes Time Division Duplexing (TDD), the method comprising steps of:
   operating and monitoring the wireless network both in a spectrum analyzer mode and a signal analyzer mode;
   utilizing the signal analyzer mode to extract synchronization information from the monitored wireless network;
   deriving a synchronization of frame of a radio frame from the synchronization information;
   utilizing the extracted information to synchronize a gate in the spectrum analyzer mode; and
   one of
   (i) recovering the frequency of any of a primary synchronization signal (PSS) and a secondary synchronization signal (SSS) using one of digital up converting and digital down converting, when a frequency of the any of the PSS and the SSS are at same frequencies as an analysis region, and an RF font end is tuned to a single frequency within a range of the analysis region for spectrum analysis, or
   (ii) alternating sample acquisition between a synchronization location and the analysis region, for recovering the frequency of any of the PSS and the SSS, when the frequency of any of the PSS and the SSS are not within the analysis region.

11. The method of claim 10, wherein the synchronization information includes any of frequency synchronization and radio frame synchronization.

12. The method of claim 10, wherein the steps further include utilizing a free running timebase that is periodically updated based on the synchronization information.

13. The method of claim 10, wherein the synchronization information is used to establish a precise timebase and/or to extend a time between synchronization of the timebase.

14. The method of claim 10, wherein the single antenna is configured to monitor uplink and downlink slots based on configuration from the synchronization information.

15. The method of claim 10, wherein the synchronization information is from a different standard than the spectrum analyzer mode operates.

16. The method of claim 10, wherein the steps further include
   hunting for interferences in an uplink (UL) reserved slot of the TDD.

* * * * *